United States Patent [19]
Jennings et al.

[11] Patent Number: 5,632,021
[45] Date of Patent: May 20, 1997

[54] COMPUTER SYSTEM WITH CASCADED PERIPHERAL COMPONENT INTERCONNECT (PCI) BUSES

[75] Inventors: William E. Jennings, Cary, N.C.; Roland G. Chan, Mountain View; John L. Wong, Belmont, both of Calif.

[73] Assignee: Cisco Systems Inc., San Jose, Calif.

[21] Appl. No.: 547,840

[22] Filed: Oct. 25, 1995

[51] Int. Cl.$^6$ .......................... G06F 13/00; G06F 13/38; G06F 13/42

[52] U.S. Cl. .......................... 395/309; 395/308

[58] Field of Search .................... 395/306, 308, 395/309, 281, 288, 280, 285

[56] References Cited

U.S. PATENT DOCUMENTS

| | | | |
|---|---|---|---|
| 5,360,952 | 11/1994 | Brajczewski et al. | 187/246 |
| 5,533,204 | 7/1996 | Tipley | 395/288 |
| 5,535,340 | 7/1996 | Bell et al. | 395/292 |
| 5,542,053 | 7/1996 | Bland et al. | 395/309 |
| 5,542,055 | 7/1996 | Amini et al. | 395/281 |
| 5,542,056 | 7/1996 | Jaffa et al. | 395/306 |
| 5,548,730 | 8/1996 | Young et al. | 395/280 |
| 5,555,383 | 9/1996 | Elazar et al. | 395/306 |
| 5,557,758 | 9/1996 | Bland et al. | 395/308 |

*Primary Examiner*—Gopal C. Ray
*Attorney, Agent, or Firm*—Elmer Galbi

[57] ABSTRACT

A system including primary and secondary PCI (Peripheral Component Interconnect) buses which do not "livelock". The system includes two PCI to PCI bridges between the primary and secondary buses. One of the bridges is configured to only act as a target on the primary bus and as a master on the secondary bus, the second bridge is configured to only act as master on the primary bus and as a target on the secondary bus. The determination of which data path is chosen is not made by the bridges and thus the bridges do not bias the direction of transmissions to one bus or to the other bus.

14 Claims, 5 Drawing Sheets

COMPUTER SYSTEM WITH CASCADED PERIPHERAL COMPONENT INTERCONNECT (PCI) BUSES

FIELD OF THE INVENTION

The invention relates to digital computers and more particularly to digital computers that include a PCI (Peripheral Component Interconnect) bus.

BACKGROUND OF THE INVENTION

The PCI bus is a high-performance expansion bus architecture that was designed to replace the traditional ISA bus(Industry Standard Architecture bus)and EISA bus (Extended industry Standard Architecture bus) buses found in many X86 based personal computers. A group of companies (including Intel, IBM, Compaq, DEC, Dell, NEC, etc.) cooperated in preparing and publishing a standard specification for the PCI bus. The specifications for the PCI bus is available from the PCI Special Interest Group, 5200 Elam Young Parkway, Hillsboro, Oreg.

In order to expand the capacity of a standard PCI bus, a bus bridge termed a PCI to PCI bridge is used. A PCI bridge provides a connection path between two independent PCI busses. The primary function of a PCI to PCI bridge is to allow transactions to occur between a master on one PCI bus and a target on the other PCI bus. A PCI to PCI bridge provides system and option card designers with the ability to overcome electrical loading limits inherent in a standard PCI bus. A PCI Special Interest Group has developed and published a specification for PCI to PCI Bridges (PCI to PCI Bridge Architecture Specifications Rev. 1.0 Apr. 5, 1994). A number of merchant semiconductor companies, such as Digital Equipment Corporation, market PCI bridge circuits. That is such companies market integrated circuits that conform to the PCI to PCI bridge specifications. For example see the 21050 PCI to PCI Bridge marketed by Digital Equipment Corporation.

The PCI to PCI bridge specification defines a number of terms which will be used hereinafter. The terms and their definition are:

initiating bus—the master of a transaction that crosses a PCI to PCI bridge is said to reside on the initiating bus.

target bus—the target of a transaction that crosses a PCI to PCI bridge is said to reside on the target bus.

primary interface—the PCI interface of the PCI to PCI bridge that is connected to the PCI bus closest to the CPU is referred to as the primary PCI interface.

secondary interface—the PCI interface of the PCI to PCI bridge that is connected to the PCI bus farthest from the CPU is referred to as the secondary PCI interface.

downstream—transactions that are forwarded from the primary interface to secondary interface of a PCI to PCI bridge are said to be flowing downstream.

upstream—transactions that are forwarded from the secondary interface to primary interface of a PCI to PCI bridge are said to be flowing upstream.

A PCI to PCI bridge has two PCI interfaces, a primary interface and a secondary interface. As defined by the PCI bridge specification, each of the interfaces is capable of either master or target operation. With respect to the bus which initiates an operation, the bridge functions as a target on behalf of the target that actually resides on the target bus. Likewise, with respect to the target bus, the bridge functions as a master on behalf of the master that actually resides on the initiating bus.

FIG. 1 shows a typical system that includes a PCI to PCI bridge of the type defined by the "PCI Special Interest Group". A CPU 110 has a host bus 111 which connects to a DRAM memory 112 and host bridge 115. The host bridge 115 connects PCI Bus 0 to the Host Bus 111. A number of PCI bus master devices 120-A, 120-B and 120-C are connected to the PCI Bus 0. A PCI to PCI bridge 130 is used to expand the bus capacity. With respect to PCI bus 0, PCI bridge 130 acts like any other PCI bus master device. However, PCI bridge 130 is also connected to a second PCI bus "PCI BUS 1" which has PCI bus master Devices 121-D, 121-E and 121-F connected thereto. With respect to PCI Bus 1, PCI-PCI bridge 130 acts similar to any other PCI bus master device.

Data can pass through PCI to PCI bridge 130 in either direction. That is, data can pass from a device on PCI BUS 0 to a device on PCI BUS 1 or data can pass in the opposite direction from a device on PCI 1US I to a device on PCI BUS 0. In a situation where several devices are trying to send data in different directions through the bridge 130, it is desirable that the direction of transmission through the bridge alternate. However, in some situations a condition known as "livelock" may occur. When "livelock" occurs the bridge continues to service the devices sending data through the bridge in one direction and the devices trying to send data through the bridge in the other direction are "locked" out from transmitting data through the bridge. The present invention is directed to preventing "livelock" from occurring.

FIG. 2 shows the general structure of a prior art PCI to PCI bridge such as the PCI to PCI bridge marketed by Digital Equipment Corporation under the designation "DECchip 21050". The PCI to PCI bridge has a primary interface 201 and a secondary interface 202. Each of the interfaces has a data path and a control path. The data paths include buffers 210 and 211. The control path in turn has two branches. One branch of the control path includes a Primary Target Interface 221 and a Secondary Master Interface 222. The second branch of the control path includes a Primary Master Interface 223 and a Secondary Target Interface 224. Configuration registers 230 include standard PCI registers such as the Vendor ID Register, the Device ID Register, the Command Register, timers, Memory Base and Limit Registers and other control circuits. The configuration registers control the operation of the PCI bus and they are set and perform the functions specified in the PCI bus standard.

SUMMARY OF THE INVENTION

A standard PCI bus includes an arbitration circuit that insures that each of the bus masters (i.e. each of the devices) on a bus can gain access to the bus and that no one bus master can monopolize use of the bus. In a system which utilizes a PCI to PCI bridge in a conventional manner "livelock" can occur. When livelock occurs, a bus master on one of the busses can monopolize the bus to the exclusion of bus masters on the other bus. The reason that livelock can occur is that PCI bridges have a pipeline delay, that is, a PCI bridge introduces one or more cycles of delay between when a particular piece of data enters the bridge and when that data emerges from the bridge.

A system may, for example, experience livelock when a bus master on the primary side of the bridge attempts to read data from a device on the secondary side of the bridge while a bus master on the secondary side of the bridge is writing data to a device on the primary side of the bridge. Such a situation is illustrated in FIG. 2A. FIG. 2A shows a PCI bridge 250 connected between a bus 251 on the primary side of the bridge and a bus 252 on the secondary side of the bridge. Bus master devices 261 and 262 are connected to bus 251 and bus master devices 271 and 272 are connected to bus 252. Bus arbitration circuit 263 is connected to bus 251 and bus arbitration circuit 273 is connected to bus 252. As shown by the dotted line, device 271 is writing to device 262 through buffer 250A when device 261 attempts to issue a read command to device 272.

In such a situation when the read operation is started, the PCI bridge 250 will have data in its write buffer 250A directed to device 262. That is, the PCI bridge 250 will be in the process of writing data to the primary side (from the secondary side) when the primary side attempts to start the read to the secondary side. When there is data in the buffer directed to the primary side and a device on the primary side tries to read data from a device on the secondary side, the read operation is given a target retry response by the PCI bridge. The target retry response will in turn cause the arbitration circuit 263 on the primary side to re-arbitrate. The PCI bridge will win the arbitration since it has data in the write buffer, and the bridge will complete the write cycle to device 262.

At the completion of the write cycle (on the secondary side), another bus master on the secondary side may start another write to the primary side. Since buffer 250A introduces a two clock delay in the PCI bridge, the arbitration circuit 273 on the secondary side of the PCI bridge will be able to grant the bus to another bus master while the primary side is still completing the previous write cycle. By the time the primary side can re-arbitrate for the bus (to re-grant it to the a bus master on the primary side), the secondary write buffer will already have data in it (restarting the livelock for a second time).

The following example shows the sequence by cycle.

|           | Primary Side                   | Secondary Side              |
|-----------|--------------------------------|-----------------------------|
| Clock 1:  | Idle                           | Write to Primary Starts     |
| Clock 2:  | Read to Secondary Starts       | Write pends for primary     |
| Clock 3:  | Target RETRY for read          | Write pends for primary     |
| Clock 4:  | Primary bus granted to Bridge  | Write continues             |
| Clock 5:  | Write starts from Secondary    | Write continues             |
| Clock 6:  | Write continues                | Write continues             |
| Clock 7:  | Write continues                | Write completes             |
| Clock 8:  | Write continues                | Idle                        |
| Clock 9:  | Write completes                | Another Write starts        |
| Clock 10: | Idle                           | Write to Primary in Progress|
| Clock 11: | Read to Secondary Starts       | Write pends for primary     |
| Clock 12: | Target RETRY for read          | Write pends for primary     |
| Clock 13: | Primary bus granted to Bridge  | Write continues             |
| Clock 14: | Write starts from Secondary    | Write continues             |
| Clock 15: | Write continues                | Write continues             |
| Clock 16: | Write continues                | Write completes             |
| Clock 17: | Write continues                | Idle                        |
| Clock 18: | Write completes                | Another Write starts        |
| Clock 19: | Idle                           | Write to Primary in Progress|

The above sequence will continues for as long as there are bus masters able to write data from the secondary side to the primary side.

This scenario may, for example, occur when data is being written into DRAM memory which is on the primary side of a PCI bridge, while at the same time the bus master on the primary side of the bridge is trying to read a register on a device on the secondary side of the PCI bridge. The situation described above can also occur if you swap the primary side with the secondary side. It will also occur if there are two reads, where each read is reading from the 'other' side of the bridge.

The present invention eliminates the above problem by providing two bridges between the primary and secondary buses. One of the bridges is configured to only act as a target on the primary bus and as a master on the secondary bus, the second bridge is configured to only act as master on the primary bus and as a target on the secondary bus. With the present invention the determination of which data path is chosen is not made by the bridges and thus the bridges do not bias the direction of transmissions to one bus or to the other bus.

DETAILED DESCRIPTION OF THE INVENTION

Figure 1:
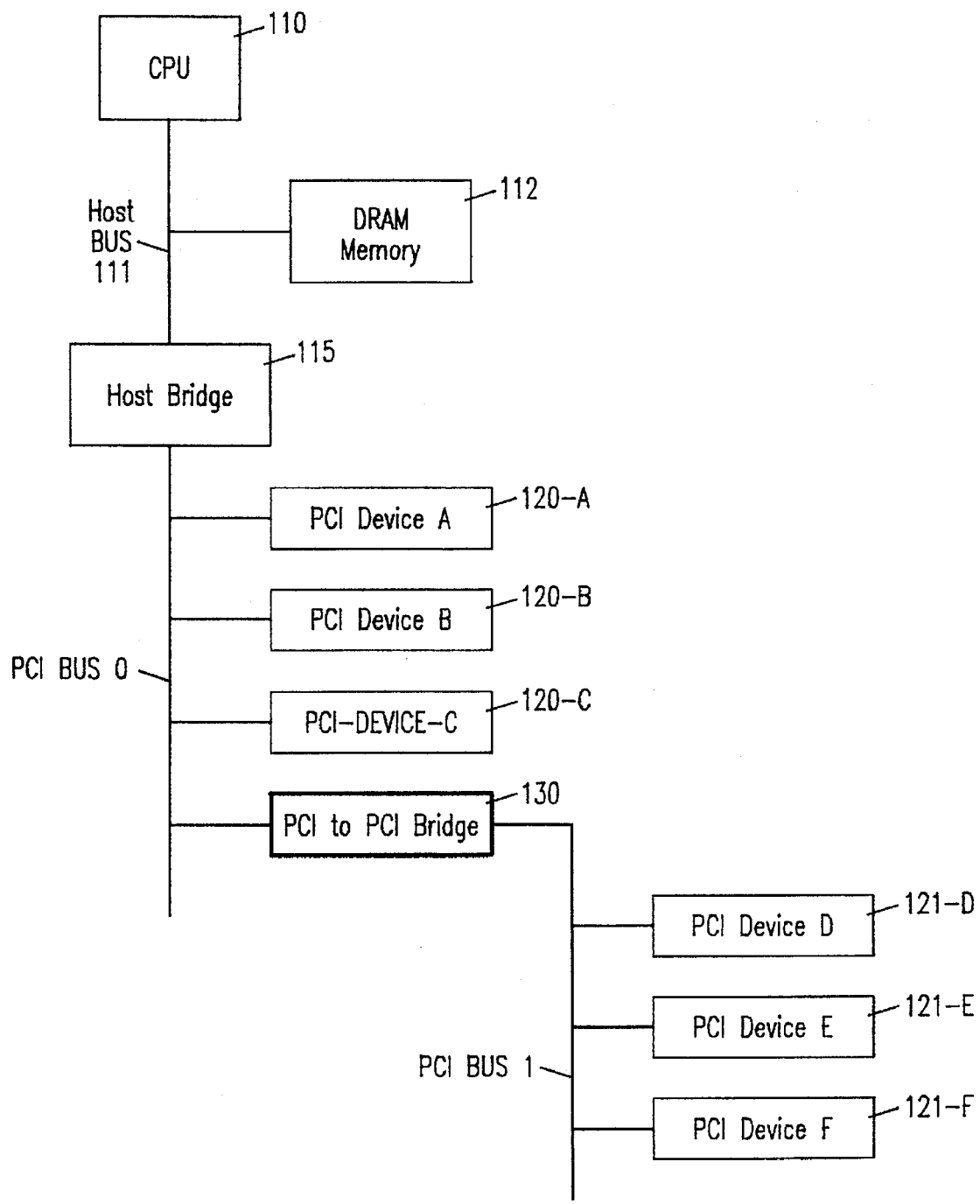
FIG. 1 is a block diagram of a prior art system which includes a PCI bridge circuit.
Figure 2:
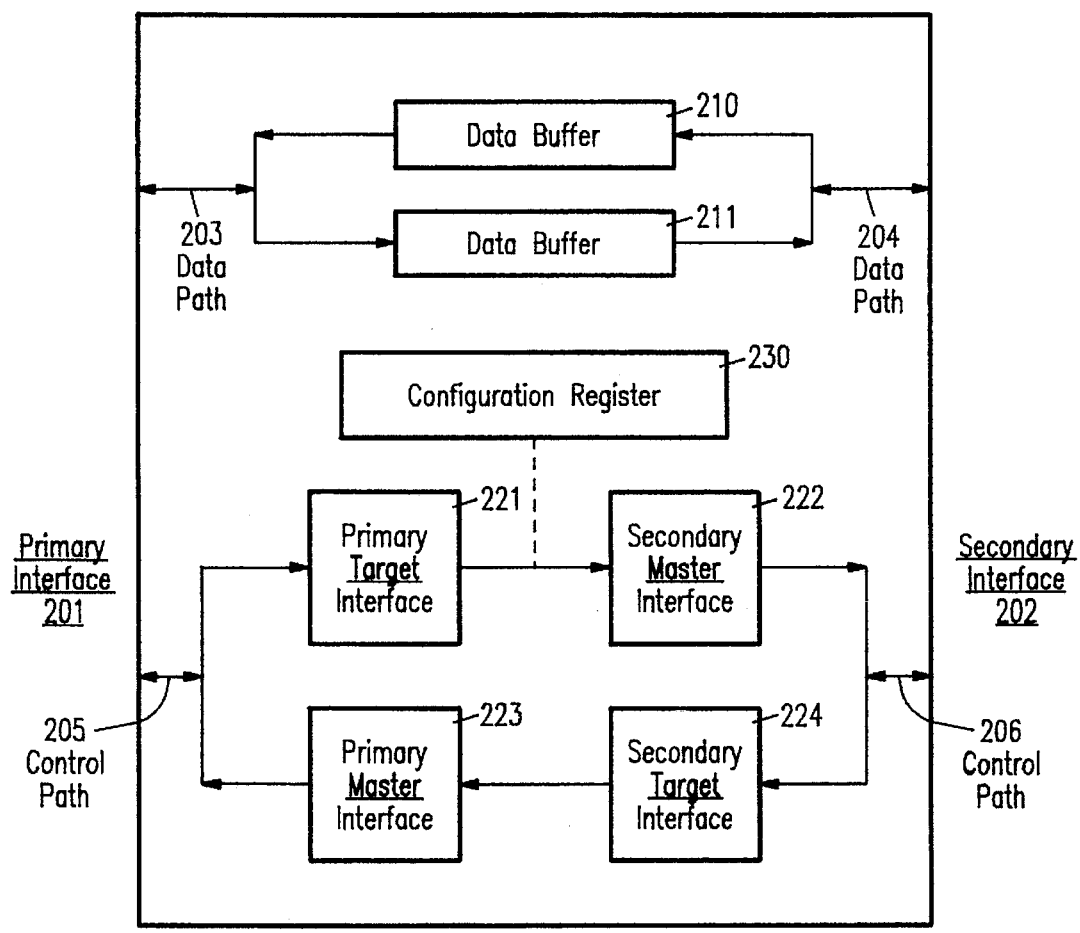
FIG. 2 is a block diagram of a standard PCI bridge circuit.
Figure 2A:
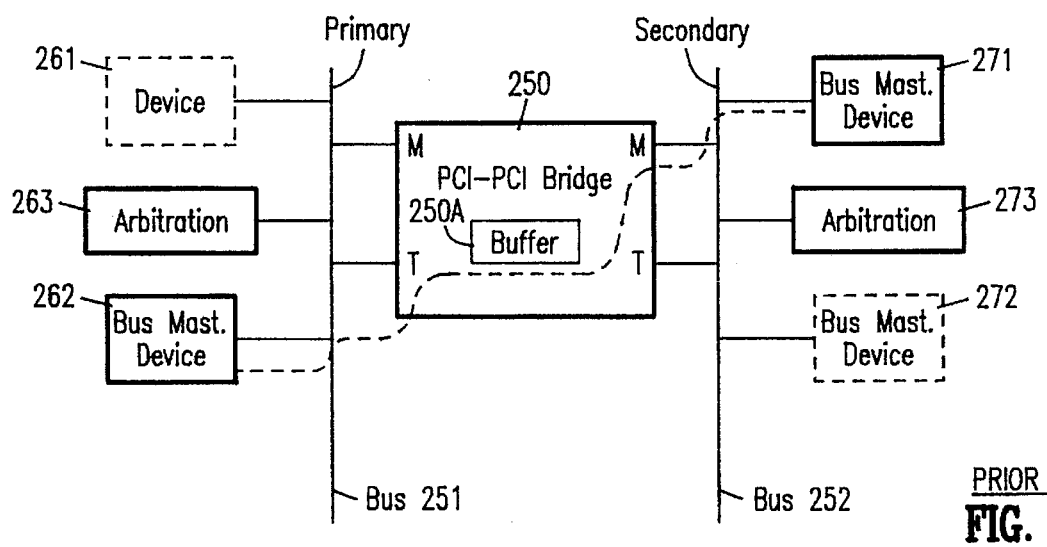
FIG. 2A is a diagram illustrating when livelock occurs in a prior art system.
Figure 3:
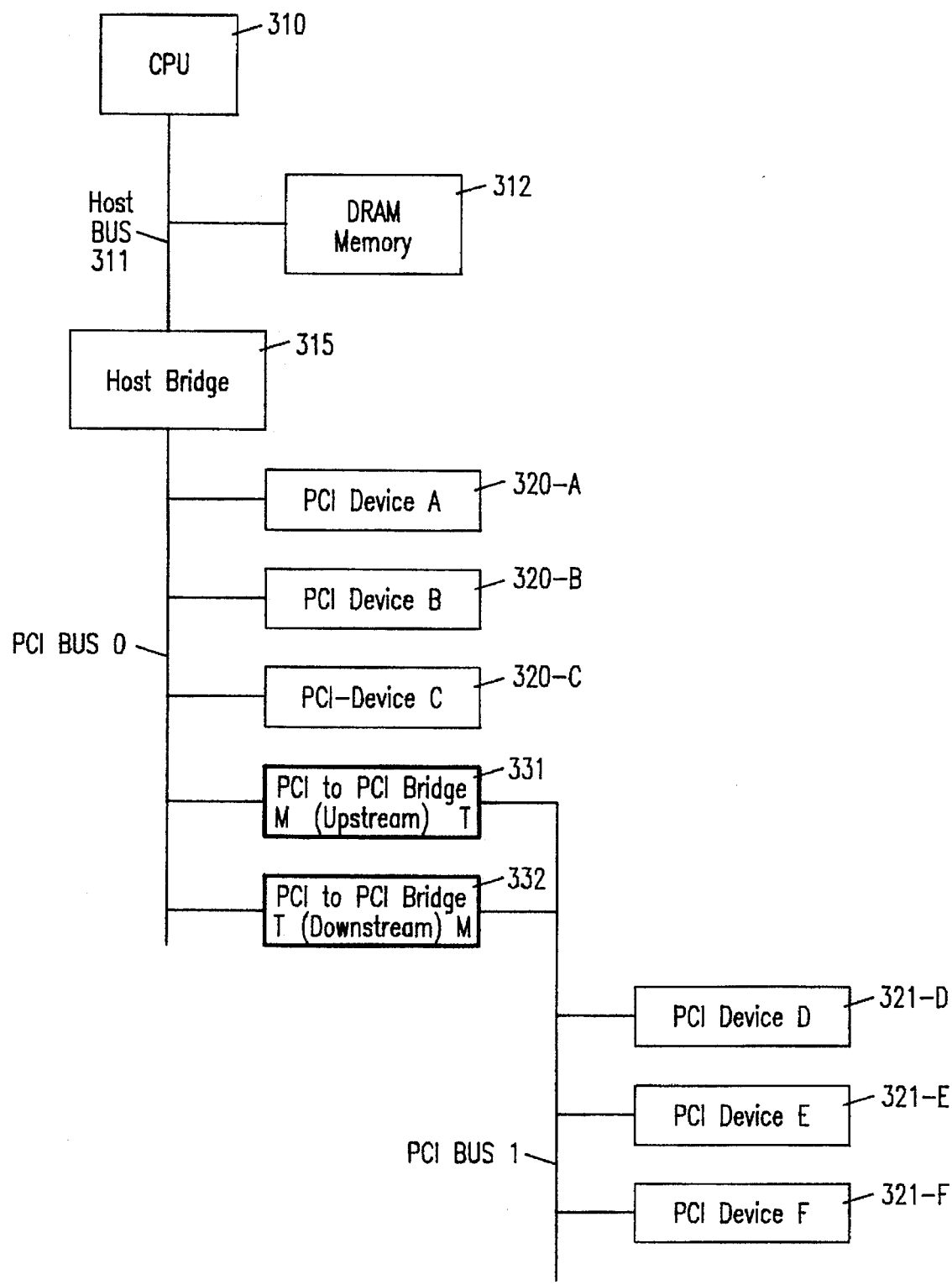
FIG. 3 is a block diagram of a system that includes the present invention.

The first preferred embodiment of the invention is shown in FIG. 3. The system shown in FIG. 3 includes a CPU 310, a host bus 311, a DRAM Memory 312.a Host bridge 315 and two PCI buses, namely PCI BUS 0 and PCI BUS 1. PCI bus 0 has devices 320-A, 320-B and 320-C attached thereto and PCI BUS 1 has devices 321-D, 321-E and 321-F connected thereto. Devices 320 and 321 can for example be Local Area Networks (LANs) Wide Area Networks (WAN's) Ethernet adapters or other types of PCI devices.

Figure 4:
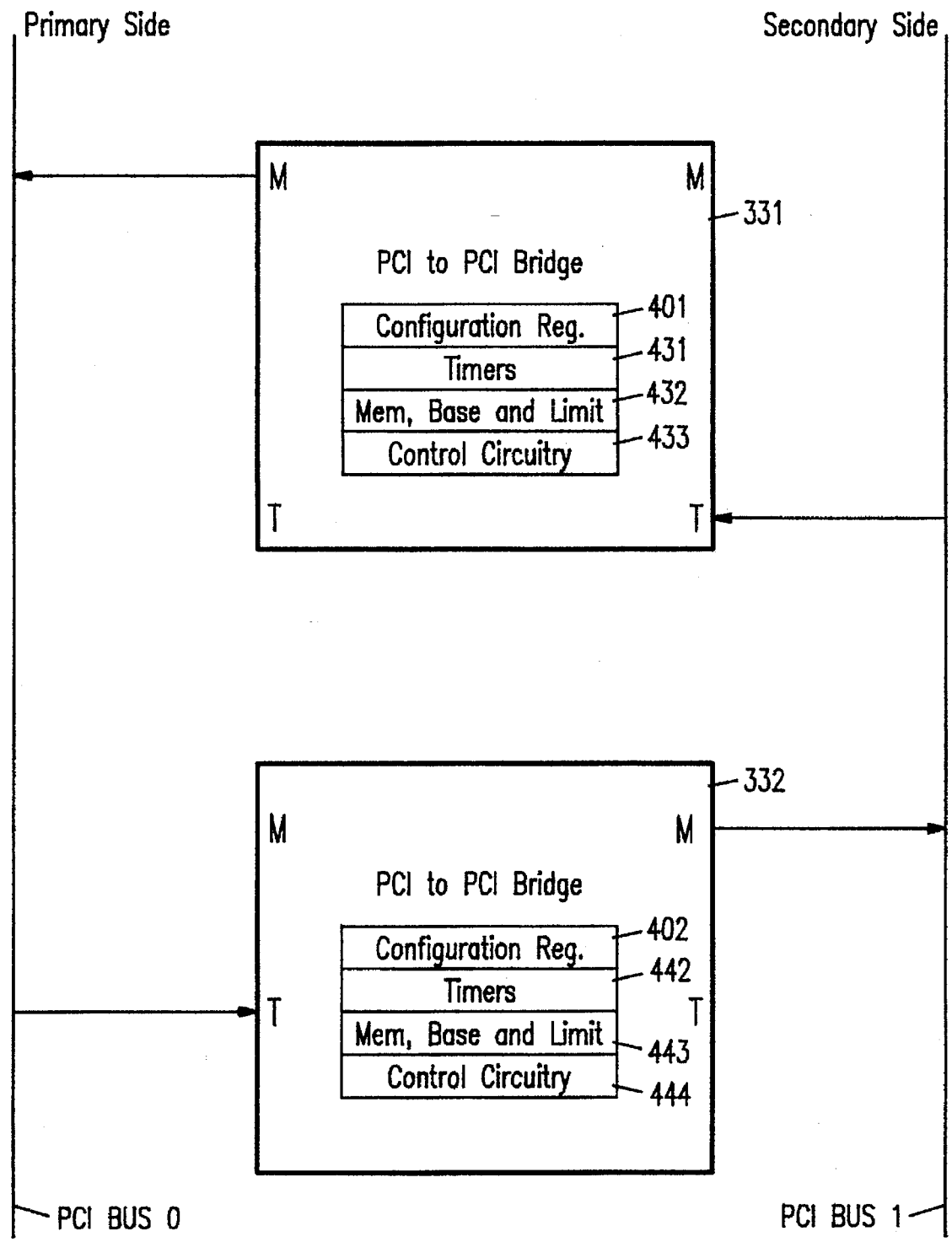
FIG. 4 is a detailed diagram of the bridge circuits shown in FIG. 3.

Two PCI to PCI Bridges, bridge 331 and bridge 332 are connected between PCI BUS 0 and PCI BUS 1. FIG. 4 shows the details of how bridges 331 and 332 are connected to PCI BUS 0 and PCI BUS 1, It is noted that the physical connections between the bridges and the busses PCI BUS 0 and PCI BUS 1 are standard PCI Bus connections. FIGS. 4 illustrates how the buses are configured to operate.

Bridge 331 has a configuration register 401 and bridge 332 has a configuration register 402. Likewise bridge 331 has timers 431, memory base and limit registers 432, and control circuitry 433. Bridge 332 has timers 442, memory base and limit registers 443, and control circuitry 444. Bridge circuits 331 and 332 are standard bridge circuits which have other components including various standard circuitry not specifically shown in FIG. 4. Bridge circuits 331 and 332 may be the commercially available integrated circuits sold by the Digital Equipment Corporation under the designation DECchip type 21050.

Registers 401 and 402 are standard PCI bus configuration registers. The various registers which comprise the configuration registers, the various bits in these registers, their operation and their function is described in the standard published PCI-PCI bridge specifications. The PCI to PCI Bridge specifications is entitled "PCI Local Bus, PCI to PCI Architecture Specifications", Revision 1.0, Apr. 5, 1994, published by the PCI Special Interest Group, M/S JF2-51 N. E. Elam Young Parkway, Hillsboro, Oreg. 97124-6497, which specifications is hereby incorporated herein by reference.

It is noted that at any particular time standard internal bridge control circuitry in each of the bridges 331 and 332 determines which side of each bridge acts as a master and which side of each bridge acts as a target. This determination is made in accordance with the rules set out in the PCI to PCI Architecture Specifications referenced above.

Of particular significance to the present invention are the Command Register Bits "1" and "2". Bit "1" is entitled the "Memory Space Enable" bit and it is defined in the standard PCI bridge specifications as follows:

Controls the bridge's response to memory accesses for both the memory mapped I/O and prefetchable memory ranges. The default state of this bit after reset is "0". The "0" and "1" states of this bit have the following functions:

0—ignore all memory transactions on the primary side
1—enable response to memory transactions on the primary interface. Normally when a system is being configured this bit left in the "0" state (which is the default after reset) until all the devices on the Primary side of the bridge have been configured. Then the bit is set to "1".

Bit "2" in the command register is entitled the "Bus Master Enable" bit. This is defined in the standard PCI Bridge specifications as:

Controls the bridge's ability to operate as a master on the primary interface on behalf of a master on the secondary interface for memory or I/O transactions. This bit does not affect the ability of a PCI to PCI bridge to forward or convert configuration commands. Note that when this bit is zero, the bridge must disable response to all memory or I/O transactions on the secondary interface (they can not be forwarded to the primary interface). The default state of this bit after reset must be "0". The "0" and "1" states of this bit are defined as follows:

0—do not initiate transactions on the primary interface and disable response to memory or I/O transactions on secondary interface.
1—enable the bridge to operate as a master on the primary interface.

Normally when a system is being configured this bit is initially left in the "0" state until the operator is satisfied that all card on the primary side of the controller are operating satisfactorily. With this bit in the "0" state "misbehavior" of cards on the secondary side do not effect the preparation of the system. Once the operator is satisfied that all cards on the primary side are operating satisfactorily the bit is set to "1".

With the present invention, in bridge circuits 331 and 332, (after the system has been initialized and checked out) the command register bits "1" and "2' are set as follows:

Bridge 331: bit 1 set to 0 bit 2 set to 1
Bridge 332 bit 1 set to 1 . . . bit 2 set to 0

With the command register bits set out above:

a) When a bus master on PCI bus 0 issues a command to a device on PCI BUS 1, the command and any resultant data flow through bridge 332. Bridge 331 will not respond to a command from a bus master on PCI BUS 0.

b) When a bus master on PCI bus I issues a command to a device on PCI BUS 0, the command and any resultant data flow through bridge 331. Bridge 332 will not respond to a command from a bus master on PCI BUS 0.

With the above configuration, the system will not experience "livelock" as is the situation where the two PCI buses are merely connected by one bridge circuit as is done in the prior art. The reason for this is as follows: If a bus master on PCI Bus 0 tries to read data from a device on PCI BUS 1 while a device on PCI Bus 1 is writing to a device on PCI BUS 0 through bridge 331(and there is data in the data buffer in bridge 331) the Bus Master on PCI BUS 1 will not receive a "target retry" response as would happen with the prior art. Instead the bridge 332 will respond and a data path will be established through PCI bridge 332. With the command registers set as described above, the internal control circuitry in the bridges does not determine which bus is the PCI target and a "read" from the secondary side can be serviced at the same time that posted data from the primary side is still in a PCI bridge.

The configuration of the present invention has two additional effects which must be taken into account. First, the order that read and write transactions occur is not predetermined or guaranteed. Second, if the bus arbitration circuitry uses what is generally termed "hidden arbitration" (i.e. during one cycle, arbitration for the next cycle begins), a "deadlock" situation is possible. If hidden arbitration is not used, there will be one or more idle states after each transaction and deadlock situations will not occur. The specific bridge circuits used in the specific embodiment of the invention shown herein, namely, the PCI to PCI bridge circuits sold by the Digital Equipment Corporation under the designation DECchip type 21050 include two timers designated the "primary target wait timer" and the "secondary target wait timer". These timers will cause the bridge to issue a "retry" if the bridge can not gain access to a bus within a pre-specified amount of time. These timers when used without hidden arbitration will prevent a deadlock condition from occurring. In order to prevent the timers from timing out at exactly the same time, the "primary target wait timer" and the "secondary target wait timer" should be set to different values. If a deadlock situation occurs, one of these timers would time out, causing that bridge to issue a "retry" command, thereby breaking the deadlock condition.

While the invention has been illustrated herein in a system utilizing two commercially available PCI bridge circuits, it should be understood that the invention could also be implemented in a single circuit with two data paths that are configured as are the two data paths in the two separate PCI-PCI bridge circuits which are shown herein.

Figure 5:
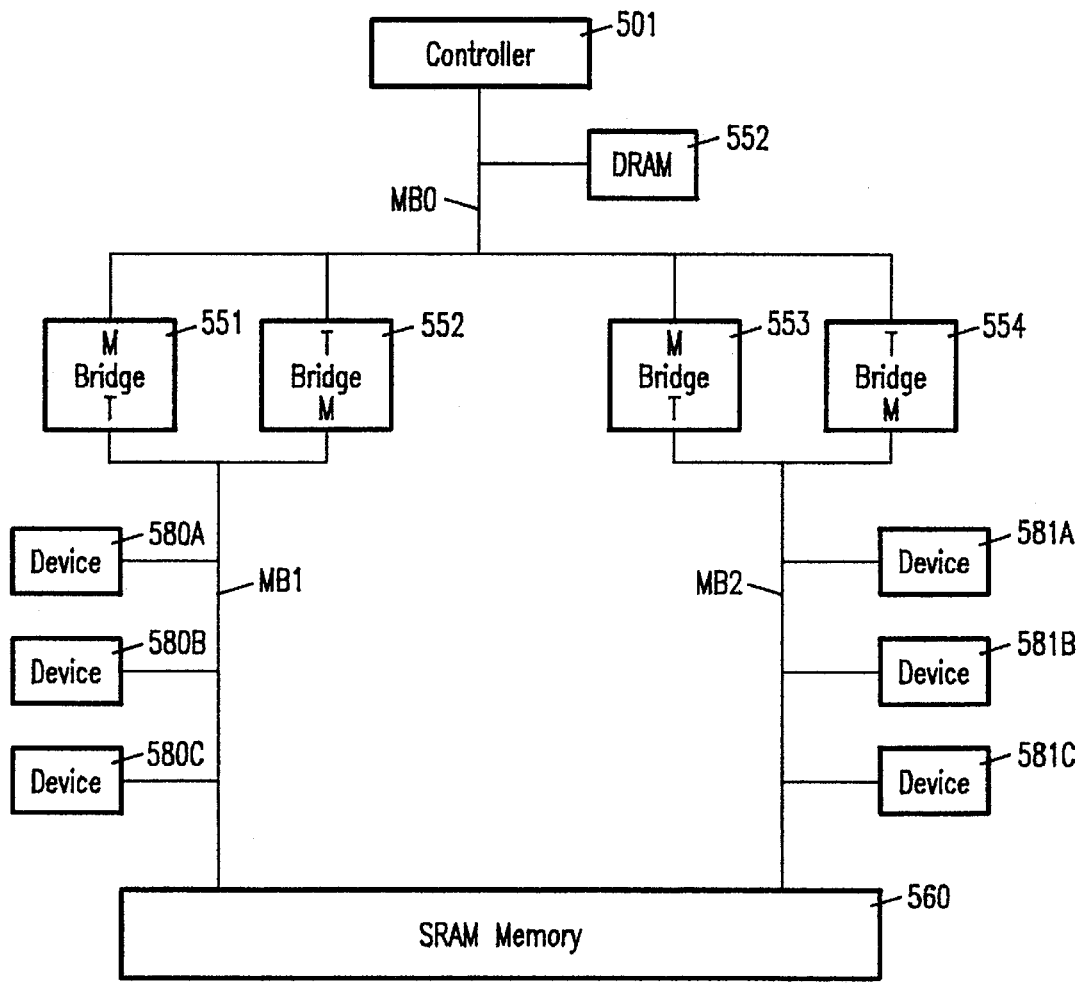
FIG. 5 is a block diagram of a second embodiment of the invention.

A second embodiment of the invention which incorporates another aspect of the invention is shown in FIG. 5. In the embodiment of the invention shown in FIG. 5, a system controller 501 which has a associated DRAM memory 552 is connected to PCI Bus MB0. PCI Bus MB0 is in turn connected to two PCI busses MB1 and MB2 using four PCI to PCI Bridges 551, 552, 553 and 554. PCI buses MB1 and MB2 are also connected to dual port SRAM memory 560. A number of bus master devices 580A to 580C are connected to bus MB1 and a number of bus master devices 581A to 581C are connected to bus MB2.

Bridge set 551 and 552 is configured as the previously described bridges 331 and 332 were configured in the first embodiment of the invention. Likewise bridges 553 and 554 are configured as previously described bridges 331 and 332.

That is, bits 1 and 2 in the in bridge circuits 551, 552, 553 and 554 (after the system has been initialized and checked out) the command register bits "1" and "2" are set as follows:

Bridge 551: bit 1 set to 0 bit 2 set to 1

Bridge 552: bit 1 set to 1 . . . bit 2 set to 0

Bridge 553: bit 1 set to 0 bit 2 set to 1

Bridge 554 bit 1 set to 1 . . . bit 2 set to 0

Figure 6:
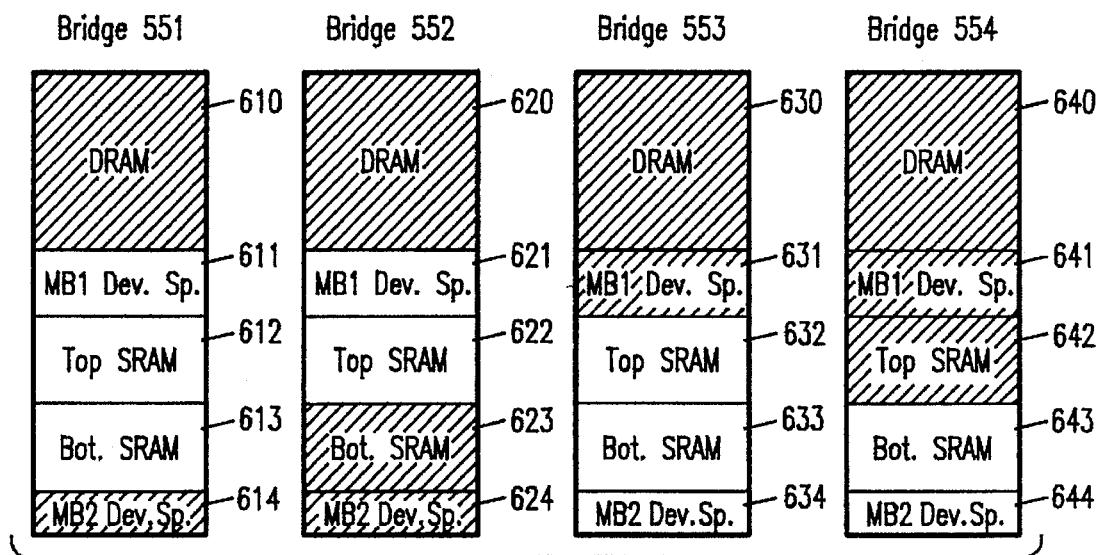
FIG. 6 is a diagram showing how the memory limit registers are set for the embodiment of the invention shown in FIG. 5.

Bridges 551, 552, 553 and 554 are bridges of the type market by Digital Equipment Corporation under the type designation 21050. Such bridges have one and only one set of base and limit registers. The unshaded area in FIG. 6 illustrates the settings of the memory registers in bridges 551 to 554. The actuarial values stored in the registers depends on the actual size of the memory and it is not relevant to the present invention. What is relevant to the present invention is that for any size memory the relative values stored in the registers must be as shown in FIG. 6.

The Memory Base register in each bridge defines the base address of a memory mapped I/O address range that is used by the bridge to determine when to forward memory transactions from one interface to the other. These register have no default values and they must be initialized by configuration software.

The Memory Limit register defines the top address (inclusive) of a memory mapped I/O address range that is used by the bridge to determine when to forward memory transactions from one interface to the other. The I/O base and I/O limit registers are used by a PCI to PCI bridge to determine when to forward PCI I/O transactions across the bridge circuits shown in FIG. 5.

A PCI to PCI bridge forwards I/O read and I/O write transactions from its primary interface to its secondary interface (downstream) when the address is in the range defined by the I/O base and I/O limit registers. Conversely, I/O transactions on the secondary bus in the address range defined by these registers are not forwarded upstream by the bridge. I/O transactions on the secondary bus that are outside the defined address range are forwarded upstream (from the secondary to the primary interface).

FIG. 6 shows how the memory registers in each of the bridges must be set in order to avoid a particular location in the SRAM memory from being accessed through both SRAM ports when controller 501 issues a memory read or write command to SRAM memory 560. The memory arrangement shown in FIG. 6 also allows the SRAM memory to have the PCI memory mapped I/O addresses on both PCI bus MB1 and on PCI bus MB2. As shown in FIG. 6, each of the bridges should be set with the same DRAM memory since no dual access problem arises relative to DRAM. With respect to the SRAM bridges 552 and 554 should be set (i.e. their memory base and limit registers should be set) so that these bridges can only access separate parts of the SRAM memory. That is, the memory base and limit registers in bridge 552 should be set so that bridge 552 only can access the top portion of the SRAM memory 560 and the base and limit registers in bridge 554 should be set so that bridge 554 can only access the bottom half of the SRAM memory.

With respect to the diagram in FIG. 6 the unshaded areas indicate the range of memory addresses designated by the memory base and limit registers in each of the bridges 551, to 554. Note that in the diagram for each bridge, the unshaded area are contiguous.

Blocks 610, 620, 630 and 640 illustrate address space for the DRAM memory. It is noted that the base and limit registers for the DRAM memory are set to the same value in each of the controllers.

Blocks 611, 621, 631 and 641 illustrate the Device Address Space for the devices on bus MB1.

Blocks 612, 622, 632 and 642 illustrate the address space for the top half of the SRAM memory.

Blocks 613, 623, 633 and 643 illustrate the address space for the bottom half of the SRAM memory.

Blocks 614, 424, 634 and 644 illustrate the address space for the devices on bus MB2. Blocks 612 and 613 and 632 and 633 are unshaded showing that with respect to bridges 551 and 553, the registers are set so that these bridges can access the entire SRAM memory. Unshaded blocks 622 and 643 show the portions of SRAM that can be accesses by bridges 552 and 554. Shaded blocks 623 and 642 show the areas of SRAM that can not be accesses by bridges 552 and 554.

The memory base and limit registers in bridges 551 and 553 must be set so that these bridges pass commands which access the entire SRAM memory. However, as shown by shaded block 614, bridge 551 does not pass commands which go to the address space of devices on bus MB2 and shaded block 631 shows that bridge 553 will not forward commands meant for devices on bus MB1.

While the invention has been shown with respect to preferred embodiments thereof, various changes in form and detail may be made without departing from the scope and spirit of the invention. The scope of the invention is defined by the appended claims.

We claim:

1. A system including a primary Peripheral Component Interconnect (PCI) bus, a secondary PCI bus, a first PCI to PCI bridge connecting said primary PCI bus to said secondary PCI bus, said first PCI to PCI bridge configured to only respond as a master on said primary bus, and as a target on said secondary bus, and a second PCI to PCI bridge connecting said primary PCI bus to said secondary PCI bus, said second PCI to PCI bridge configured to only respond as a master on said secondary bus and as a target on said primary bus, whereby said system avoids a livelock situation with respect to transmissions between said primary and said secondary buses.

2. The system recited in claim 1 including means for preventing said first PCI to PCI bridge from responding as a master on said secondary bus.

3. The system recited in claim 1 including means for preventing said second PCI to PCI bridge from responding as a master on said primary bus.

4. The system recited in claim 1 including a configuration register in said first PCI to PCI bridge and means responsive to said configuration register for preventing said first PCI to PCI bridge from responding as a master on said secondary bus.

5. The system recited in claims 1 including a configuration register in said second PCI to PCI bridge and means responsive to said configuration register for preventing said second PCI to PCI bridge from responding as a master on said primary bus.

6. A system including a host controller, a first Peripheral Component Interconnect (PCI) bus connected to said host controller, a second PCI bus, a third PCI bus, a first and a second PCI bridge circuit connecting said first PCI bus to said second PCI bus, said first PCI bridge configured to act as a master only on said first PCI bus and said second PCI bridge configured to act as a master only on said second PCI bus, and third and fourth PCI bridge circuits connecting said first PCI bus to said third PCI bus, said third PCI bridge configured to act as a master only on said first PCI bus and said fourth PCI bridge configured to act as a master only said third PCI bus, whereby a livelock situation is avoided relative to transmissions between said buses.

7. The system recited in claim 6 including a dual port SRAM memory connected to said second PCI bus and to said third PCI bus.

8. The system recited in claim 7 wherein said SRAM memory has a range of addresses and first, second third and fourth PCI bridge circuits each contain a memory base register and a memory limit register defining the memory addresses of commands that can be forwarded by said bridges, the memory base and limit registers being set so that said first and third bridge circuits pass commands that address the entire range of addresses in said SRAM memory, said second bridge circuit only addresses the top half of said range of addresses and said forth bridge circuits only addresses the bottom half of said range of memory addresses.

9. The system recited in claim 6 including means for preventing said first PCI to PCI bridge from responding as a master on said second PCI bus.

10. The system recited in claim 6 including means for preventing said second PCI to PCI bridge from responding as a master on said first PCI bus.

11. The system recited in claim 6 including a configuration register in said first PCI to PCI bridge and means responsive to said configuration register for preventing said first PCI to PCI bridge from responding as a master on said second PCI bus.

12. The system recited in claims 6 including a configuration register in said second PCI to PCI bridge and means responsive to said configuration register for preventing said second PCI to PCI bridge from responding as a master on said first PCI bus.

13. A system including a first bus, a second bus, a bridge connecting said first bus to said second bus, said first bus configured to only respond as a master on said first bus, and as a target on said second bus, and a second bridge connecting said first bus to said second bus, said second bridge configured to only respond as a master on said second bus and as a target on said first bus, whereby said system avoids a livelock situation with respect to transmissions between said first and said second buses.

14. The system recited in claim 13 wherein said first and said second buses are Peripheral Component Interconnect (PCI) buses.

* * * * *